(12) United States Patent
Perlman

(10) Patent No.: US 6,353,422 B1
(45) Date of Patent: Mar. 5, 2002

(54) VIRTUAL DISPLAY SYSTEM AND METHOD

(75) Inventor: Stephen G. Perlman, 1107 Hamilton Ave., Palo Alto, CA (US) 94301

(73) Assignee: Stephen G. Perlman, Palo Alto, CA (US)

(*) Notice: Subject to any disclaimer, the term of this patent is extended or adjusted under 35 U.S.C. 154(b) by 0 days.

(21) Appl. No.: 09/540,134

(22) Filed: Mar. 31, 2000

(51) Int. Cl.$^7$ .............................................. G09G 5/00
(52) U.S. Cl. .................................. 345/7; 345/8; 345/9
(58) Field of Search .......................... 345/156, 7, 8; 359/13, 360; 348/56; 623/6.63

(56) References Cited

U.S. PATENT DOCUMENTS

| | | | |
|---|---|---|---|
| 5,305,124 A | * 4/1994 | Chern et al. | 359/13 |
| 5,440,428 A | * 8/1995 | Hegg et al. | 359/630 |
| 5,467,104 A | 11/1995 | Furness, III et al. | |
| 5,596,339 A | 1/1997 | Furness, III et al. | |
| 5,653,751 A | * 8/1997 | Samiy et al. | 623/6.63 |
| 5,659,327 A | 8/1997 | Furness, III et al. | |
| 5,701,132 A | 12/1997 | Kollin et al. | |
| 5,712,649 A | * 1/1998 | Tosaki | 345/8 |
| 5,821,989 A | * 10/1998 | Lazzaro et al. | 348/56 |
| 5,864,384 A | 1/1999 | McClure et al. | |
| 5,883,606 A | * 3/1999 | Smoot | 345/7 |
| 5,903,397 A | * 5/1999 | Melville et al. | 359/630 |
| 5,910,834 A | 6/1999 | McClure et al. | |
| 5,940,166 A | * 8/1999 | Miller | 351/221 |
| 6,043,799 A | * 3/2000 | Tidwell | 345/7 |
| 6,097,353 A | * 8/2000 | Melville et al. | 345/8 |
| 6,154,321 A | * 11/2000 | Melville et al. | 359/630 |
| 6,229,503 B1 | * 5/2001 | Mays, Jr. et al. | 345/7 |

OTHER PUBLICATIONS

"The Virtual Retinal display—A Retinal Scanning Imaging System", Michael Tidwell, et al., University of Washington, Seattle, WA, Human Interface Technology Laboratory, pp. 325–333.
"Development of a Commercial Retinal Scanning Display", University of Washington, Seattle, WA, Richard S. Johnson and Stephen R. Willey, 12 pp.
"Virtual Retinal Display", Microvision, http://www.mvis.com/html/technology.html, 2 pp.
"Virtual Retinal Display", Microvision, http://www.mvis.com/html/display.html, 2 pp.
"Virtual Retinal Display", Microvision, http://www.mvis.com/html/advantages.html, 3 pp.
"Virtual Retinal Display", Microvision, http://www.mvis.com/html/performance.html, 3 pp.
PCT/US00/19613, PCT Search Report 3 pp., Nov. 14, 2000.

* cited by examiner

Primary Examiner—Chanh Nguyen
Assistant Examiner—Fritz Alphonse
(74) Attorney, Agent, or Firm—Blakely, Sokoloff, Taylor & Zafman

(57) ABSTRACT

A virtual image system is disclosed comprising: a passive optical unit for interfacing with portions of a user's head; and an optical projection unit directing a retinal scanning beam into the passive optical unit, the optical projection unit detached from the passive optical unit.

26 Claims, 12 Drawing Sheets

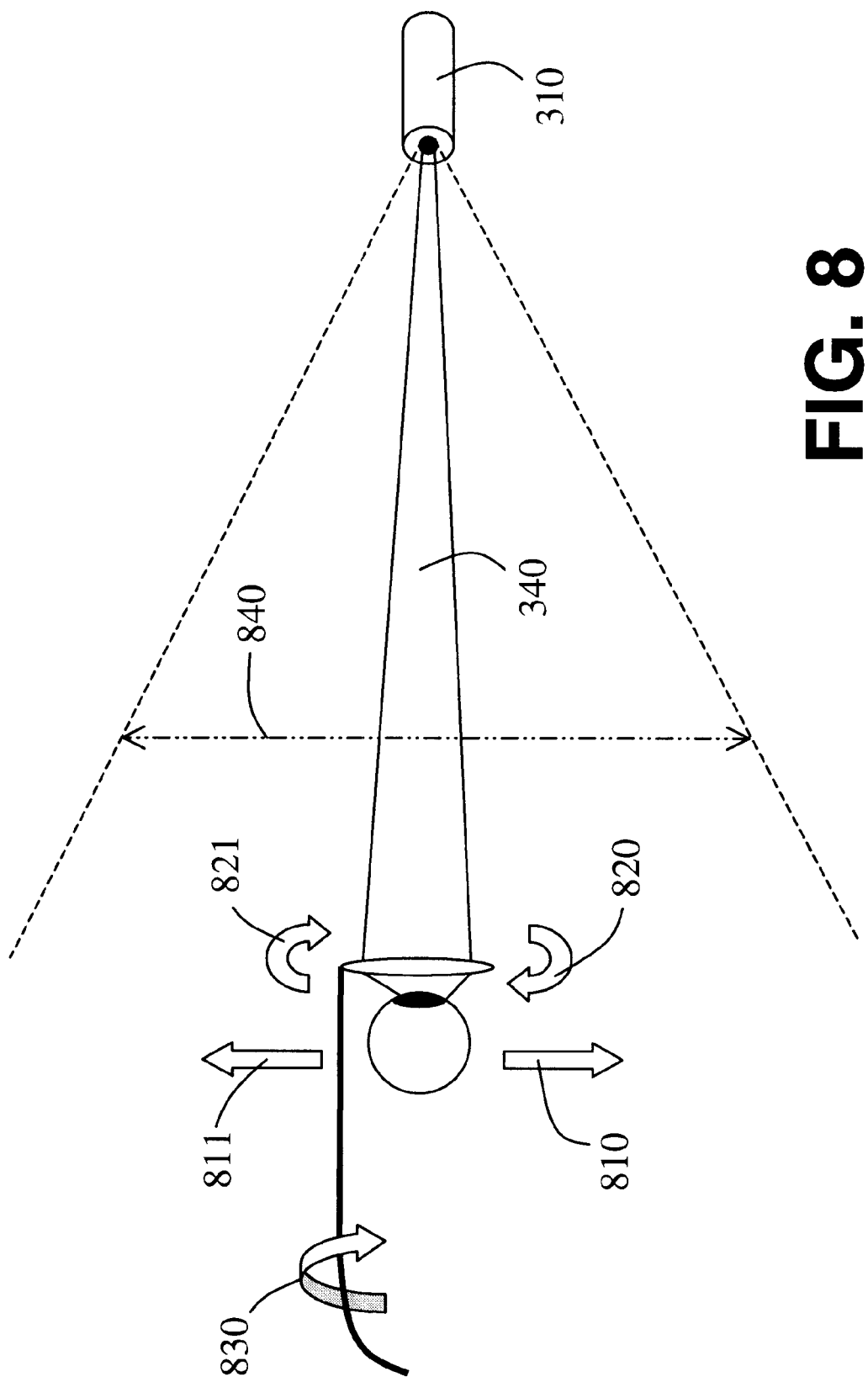

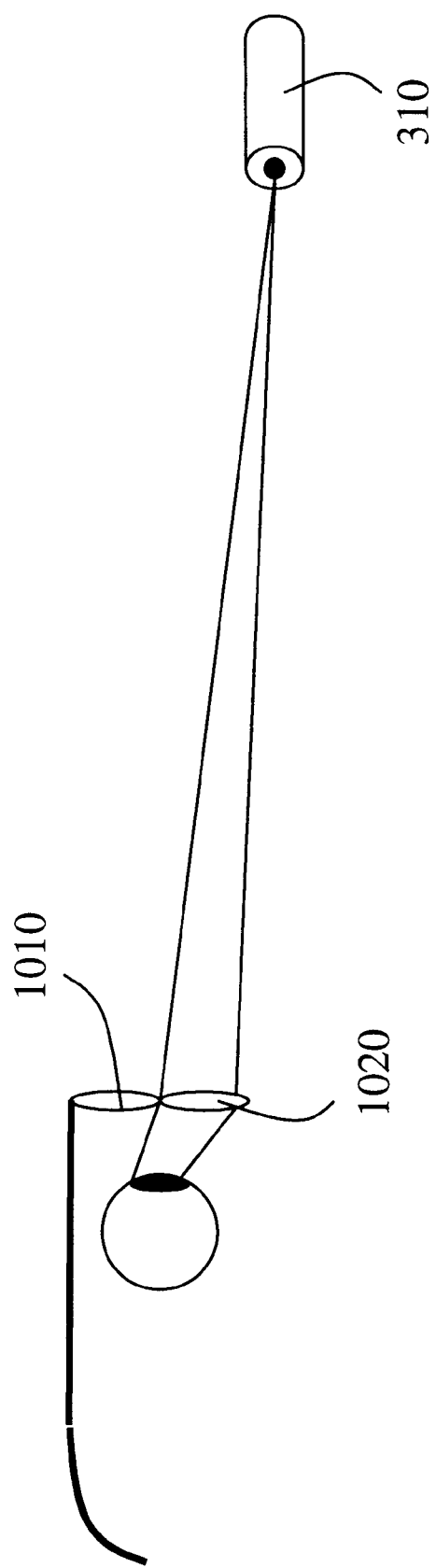

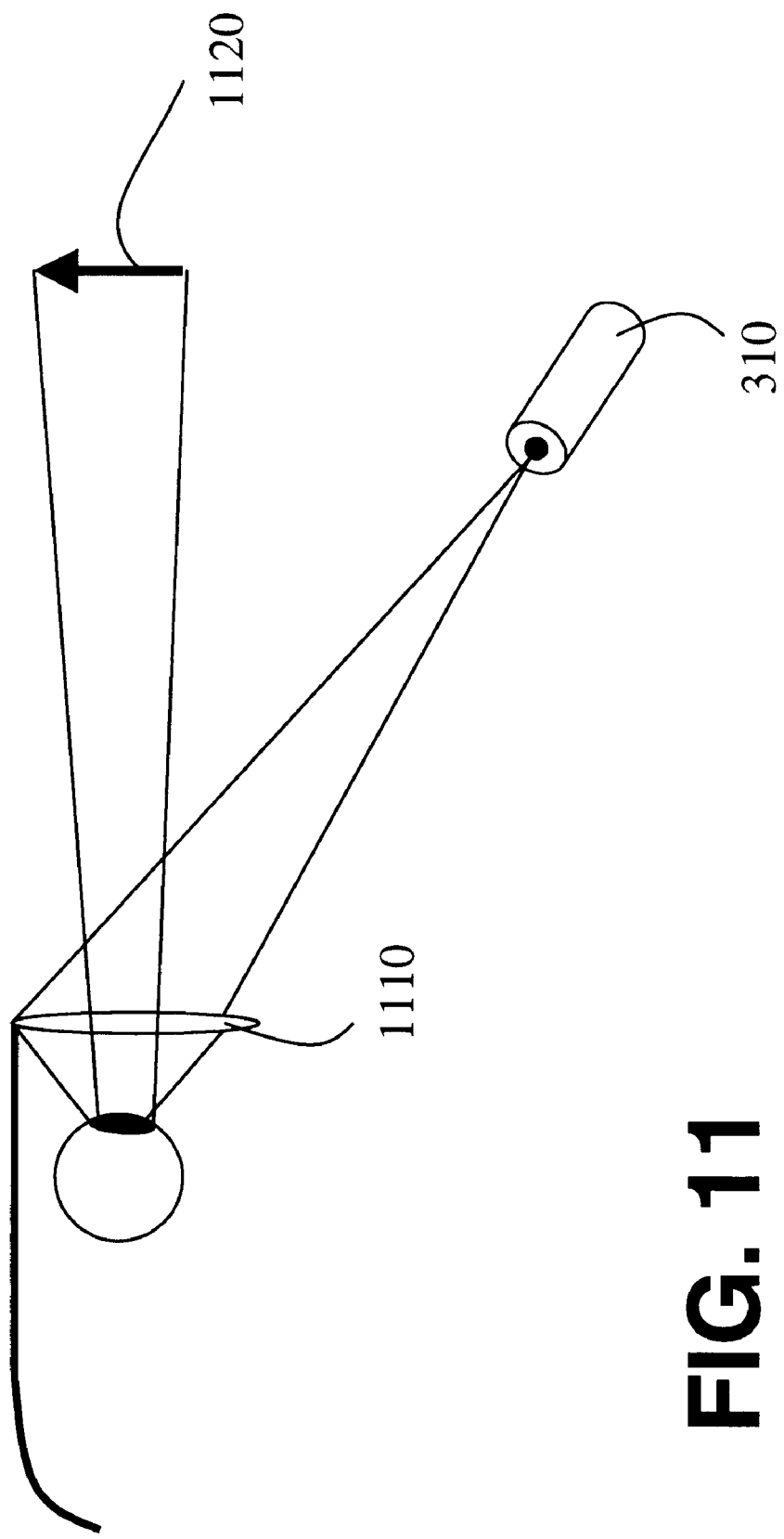

VIRTUAL DISPLAY SYSTEM AND METHOD

BACKGROUND OF THE INVENTION

1. Field of the Invention

This invention relates generally to the field of virtual display systems. More particularly, the invention relates to a system and method for scanning a virtual image on a retina.

2. Description of the Related Art

Traditional display systems such as television and computer monitors produce "real" images. This means that the light waves producing the image actually emanate from the image point. Thus, as illustrated in FIG. 1, a traditional monitor such as a cathode ray tube ("CRT") produces an actual image 110 by irradiating pixels on a monitor 120 using an electron beam. Light waves emanating from the image 110 are then focused by the cornea (not shown) and the focused image is reproduced on the retina 140 (i.e., the back surface of the eye).

There are several problems with real image display systems. For example, these systems are typically large and cumbersome and require substantial amounts of power to operate (e.g., to illuminate the individual pixels on the CRT). In addition, these systems to not provide an adequate level of privacy. Anyone within the visual range of a CRT monitor 120 is able to view its contents, making these systems ill-suited for viewing confidential material in public places.

To solve some of these problems "virtual" display systems were developed. In contrast to a "real" display system, a "virtual" display system is one in which the light producing the image does not actually emanate from the image—it only appears to.

One type of virtual display system scans photons which contain image data directly onto the retina of a user's eye. As illustrated in FIG. 2, a photon source 220 such as a laser diode generates a coherent beam of light (the photon source 220 may actually be three photon sources if a color image is rendered). The beam of light is intensity-modulated by modulation unit 230 to match the intensity of the image being generated. A beam scanner 240 receives the modulated signal and scans the modulated signal across the retina using a particular scan pattern (e.g., raster scan pattern, vector scan pattern . . . etc). An optical projection unit 250 may be comprised of one or more lenses for properly focusing the scanned pattern into the eye.

Although the virtual display system illustrated in FIG. 2 solves some of the problems associated with real display systems (described above), a number of problems remain. Most of these problems stem from the fact that both the beam scanning unit 240 and the optical projection unit 250 must be located in close proximity to the user's eye (i.e., so that the scanned signal may be properly positioned to scan across the user's retina). Accordingly, to implement the system of FIG. 2, a user must wear a headset or a pair of virtual display glasses which include a substantial amount of hardware.

One obvious problem with this configuration is that it forces a user to wear a heavy, bulky apparatus which may dissipate a substantial amount of heat. While such a system may be acceptable for specialized purposes (e.g., an army helicopter helmet, medical surgery glasses . . . etc) it is unlikely that mainstream users are willing to wear such a device on a regular basis.

Accordingly, what is needed is a virtual display system and method which solves the foregoing problems.

SUMMARY OF THE INVENTION

A virtual image system is disclosed comprising: a passive optical unit for interfacing with portions of a user's head; and an optical projection unit directing a retinal scanning beam into the passive optical unit, the optical projection unit detached from the passive optical unit.

BRIEF DESCRIPTION OF THE DRAWINGS

All figures described below are two-dimensional for the sake of illustration. A better understanding of the present invention can be obtained from the following detailed description in conjunction with the drawings, in which:

FIG. 8 illustrates a variety of passive optical system movements to which the virtual display system and method responds.

FIG. 10 illustrates an embodiment of the virtual display system which includes a bifocal lens.

FIG. 11 illustrates an embodiment of the virtual display system in which holographic lenses are used to refract a retinal scanning beam.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

In the embodiment of the system illustrated in FIG. 3, most of the electrical and optical projection hardware and/or software 310, including the scanning unit (hereinafter the "optical projection unit 310"), is removed from the user's headset 320. The only apparatus worn by the user is a "passive" optical unit 330—e.g., a pair of glasses or contact lenses—which refracts the scanned beam 340 and directs it into the user's eyes 350. As a result, this embodiment solves many of the problems with the prior art. For example, the user is no longer burdened with wearing a bulky, strange looking, potentially warm headset.

Figure 1:
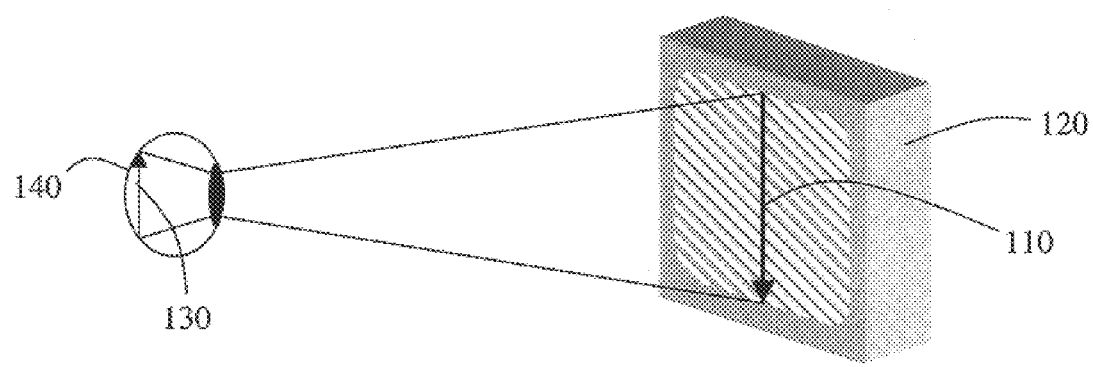
FIG. 1 illustrates a real image being viewed on a computer or television monitor.
Figure 2:
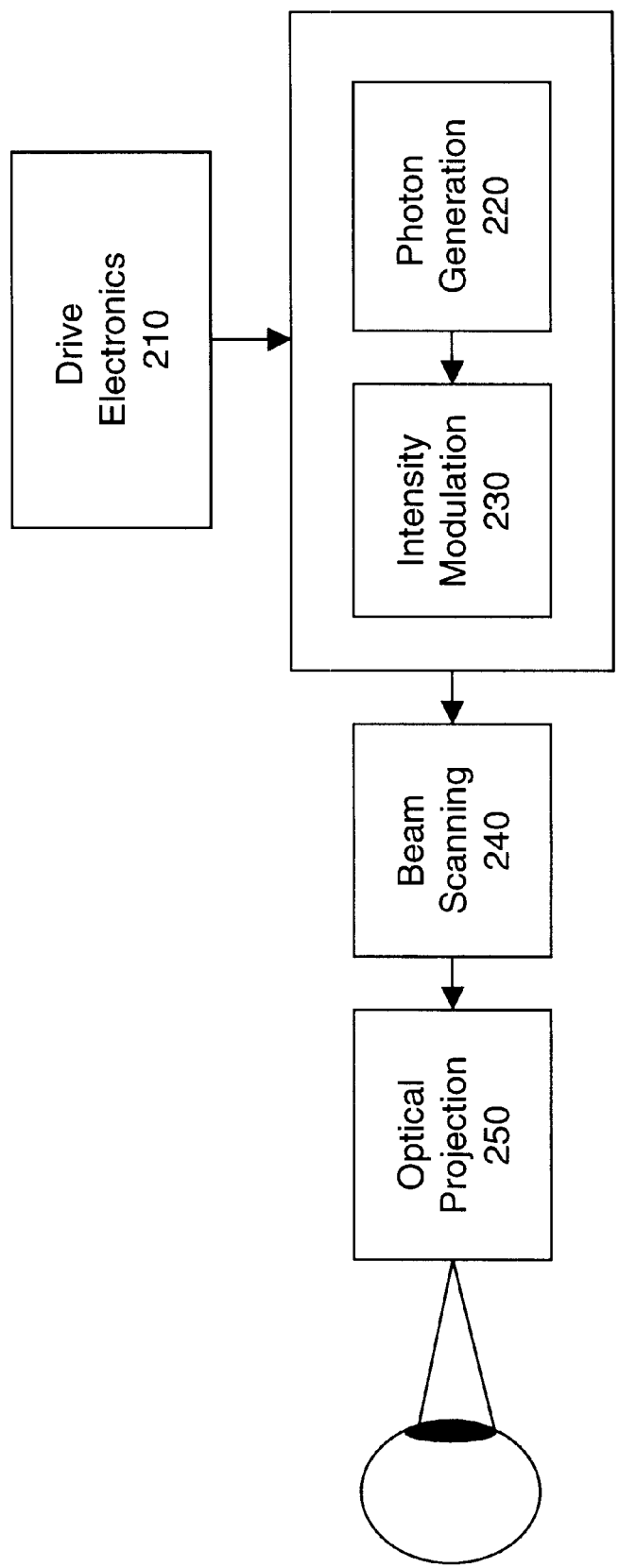
FIG. 2 illustrates a prior art system for generating a virtual image on a retina.
Figure 3:
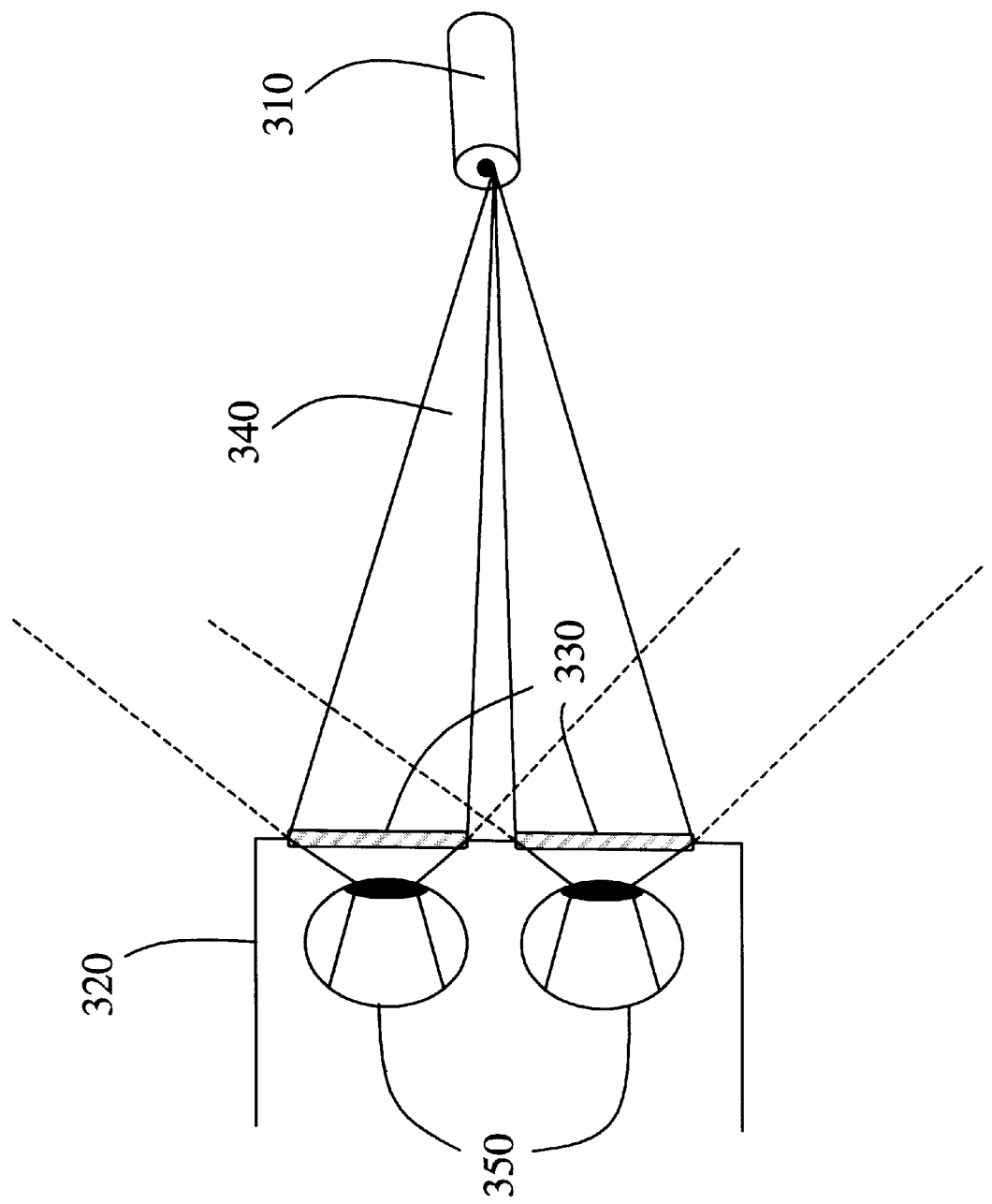
FIG. 3 illustrates one embodiment of the virtual display system.

Although the embodiment illustrated in FIG. 3 shows a single optical projection unit 310, two separate optical projection units may also be employed—one for each eye. This configuration may be particularly useful for producing stereographic images (i.e., where different images are projected into each eye). The decision to employ one or two optical projection units 310 may be based on the speed with which a single unit 310 is capable of scanning each of the user's retinas and jumping between them.

In addition, the glasses or contact lenses 330 worn by the user may be holographic glasses/lenses. As it is known in the art, a holographic lens can be configured so that each point within the lens will refract the incoming scanning beam at specified angles. Thus, holographic lenses provide a relatively inexpensive mechanism for directing the scanning beam into the user's retinas in a precise manner.

Figure 4:
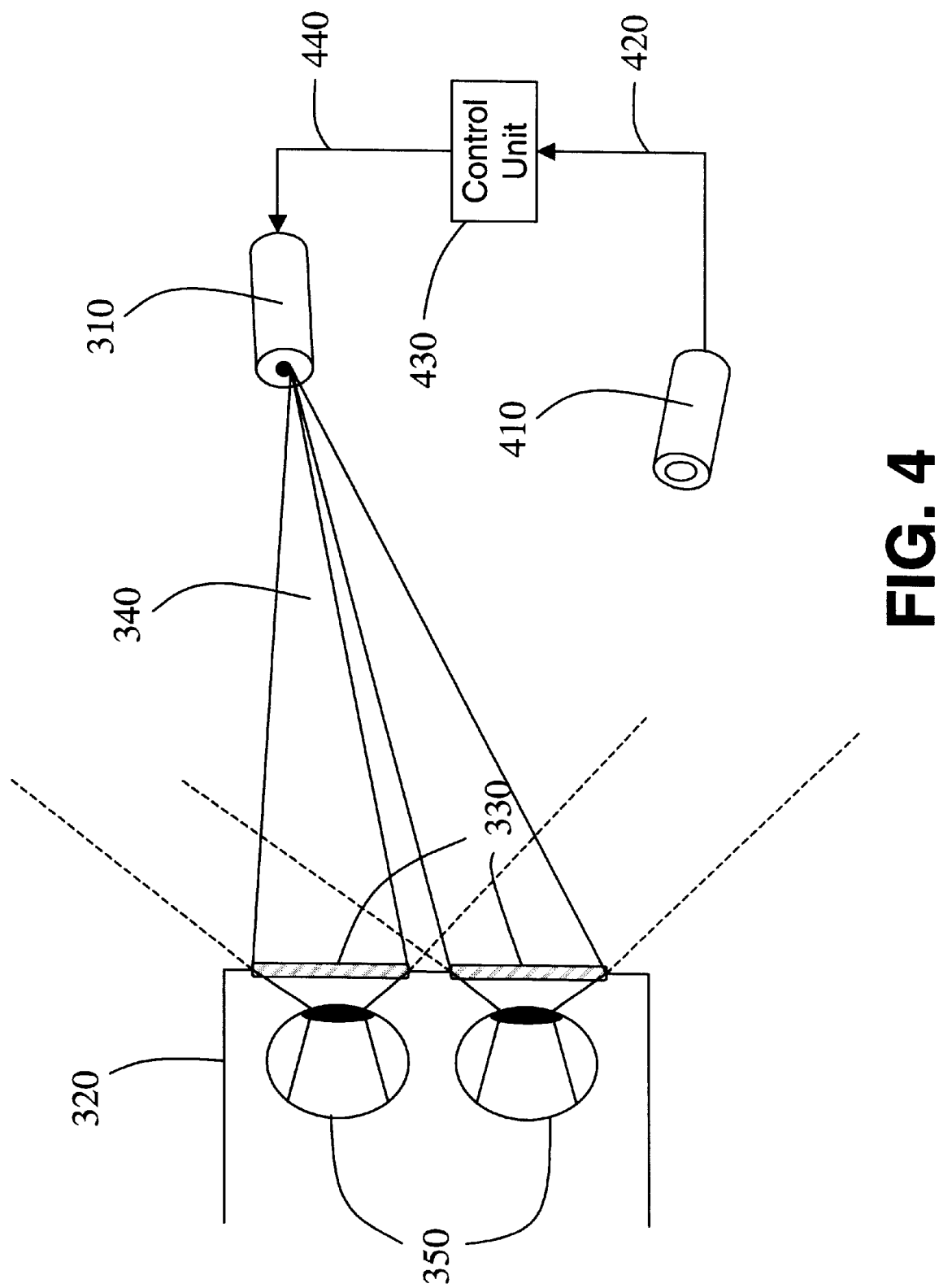
FIG. 4 illustrates an embodiment of the virtual display system which includes a tracking unit.

In FIG. 4 an embodiment of the system is illustrated in which a tracking unit 410 tracks the position ('x,' 'y,' 'z' coordinates) and angle ('yaw,' 'pitch,' and 'roll') of the glasses 330 in the user's headset 320 or contact lenses. The resulting positional data 420 is transmitted to a control unit 430 which generates a control signal 440 to control the retinal scanning beam 340 output from the projection unit 310.

Figure 5:
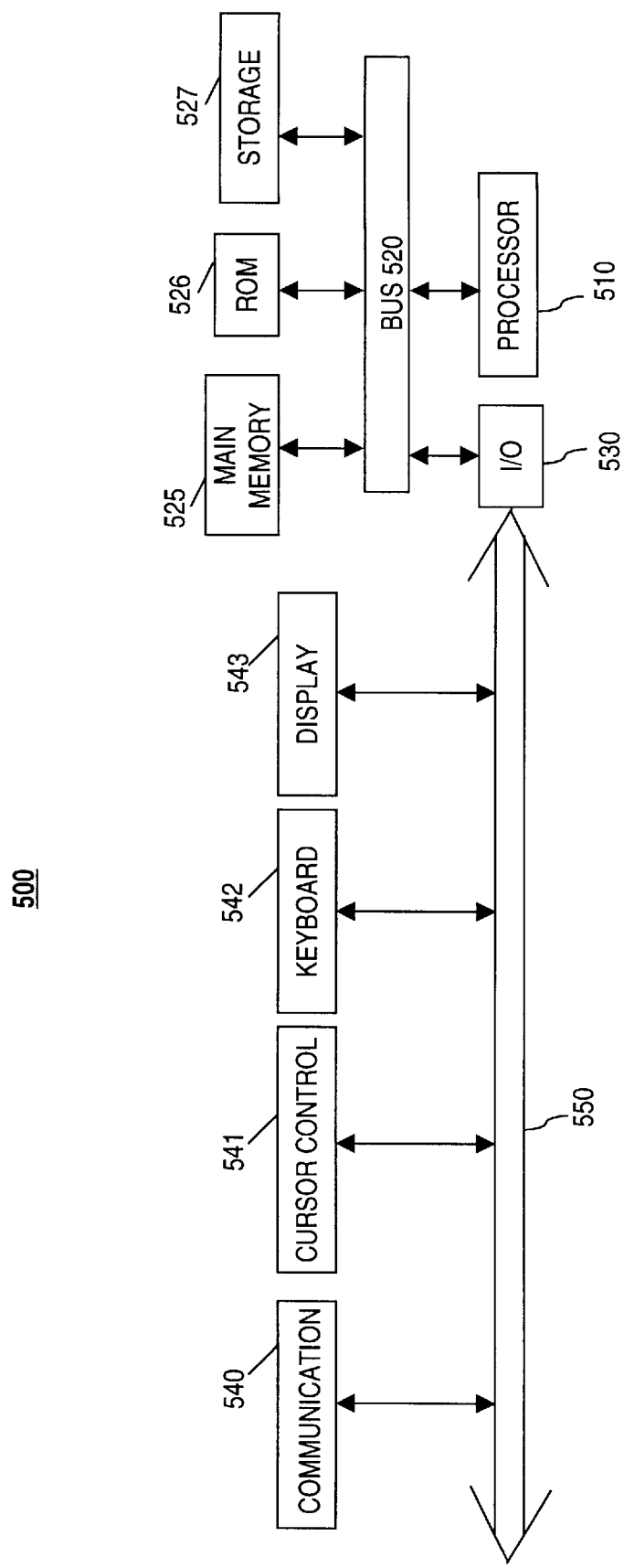
FIG. 5 illustrates an exemplary computer architecture used to implement elements of the virtual display system.

Control unit 430 may be comprised of hardware or any hardware/software combination. In one embodiment, control unit 430 is a computer system 500 such as the one illustrated in FIG. 5. Computer system 500 comprises a system bus 520 for communicating information, and a processor 510 coupled to bus 520 for processing information. Computer system 500 may further comprise a random access memory ("RAM") or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Computer system 500 can also be coupled to an I/O bus 550 via an I/O interface 530. A plurality of I/O devices may be coupled to I/O bus 550, including, for example, a display device 543, an input device (e.g., an alphanumeric input device 542 and/or a cursor control device 541). In one embodiment of the system, a communication device 240 receives the positional signal 420 and transmits the control signal 440 in response.

Tracking unit 410 tracks the position and angle of the pair of glasses 330 or contact lenses using various tracking techniques. For example, in one embodiment of the system, tracking unit 410 is a camera which (in combination with control unit 430) implements robotic vision techniques similar to those used to identify parts on manufacturing assembly lines. In an embodiment in which the user wears contact lenses rather than glasses, the tracking unit may track the user's pupils and/or other features of the user's face.

Figure 6:
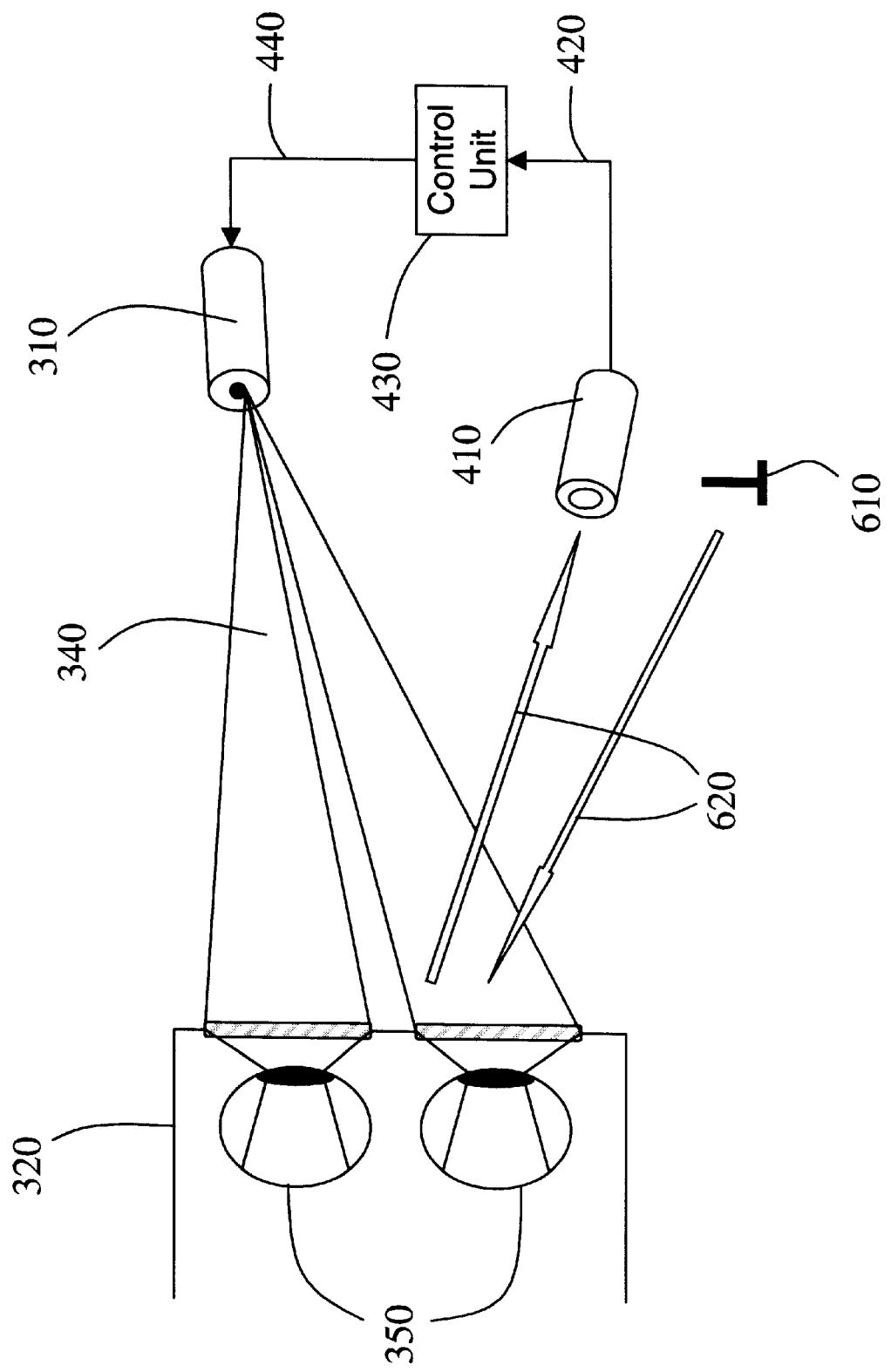
FIG. 6 illustrates an embodiment of the virtual display system which includes a signaling unit and a tracking unit.
Figure 7A:
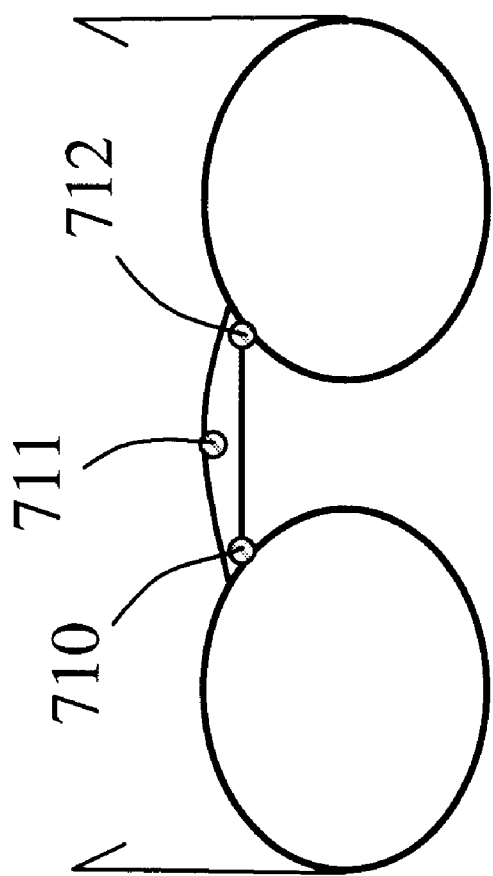
FIG. 7a illustrates target points disposed on a pair of glasses used in one embodiment of the system.
Figure 7B:
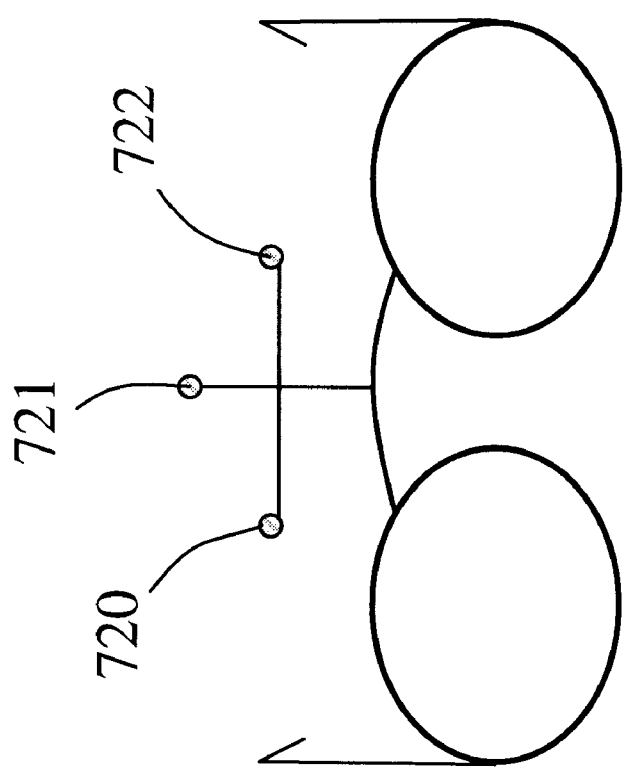
FIG. 7b illustrates an alternative set of target points disposed on a pair of glasses used in one embodiment of the system.

In the embodiment illustrated in FIG. 6, a signaling unit 610 produces a tracking signal 620 which is projected off of portions of the user's face and/or pair of glasses 330. For example, an infrared signal may be transmitted to target points on the user's headset 320 which are particularly adapted to reflecting infrared radiation. As illustrated in FIG. 7a and 7b, three such target points 710–712 and 720–722, respectively, may be defined on the front of the user's headset. Tracking unit 410 in this embodiment will transmit raw positional data 420 for each of the points 710–712 or 720–722 to control unit 430 and, using the predefined spatial relationship between these three points 710–712 or 720–722, control unit 430 will determine the exact position and angle of the glasses 330. For example, in a three dimensional space this position/angle may be defined by the 'x,' 'y,' and 'z,' coordinates and the 'yaw,' 'pitch' and 'roll' of the glasses/contacts.

In an embodiment where contact lenses are used instead of glasses, these three positional points 710–712 may actually be portions of a user's face. For example, tracking unit 410 in this embodiment may track the position of the user's two pupils and the tip of the user's nose. Control unit 430 in this embodiment may be pre-programmed with the spatial relationship between these three points. Alternatively, a reflective substance may be painted/stamped on the user's face and/or forehead to produce the target points. Ideally, this substance would be one which reflects a particular type of signal/waveform not visible to the human eye (e.g., an infrared signal).

In one embodiment of the system, optical projection unit 310 (in response to control signal 440) modifies the scanned beam 340 differently based on the particular motion of the user's face and/or pair of glasses. For example, as illustrated in FIG. 8, the optical projection unit 310 may have a relatively wide scanning range 840. When the user's face and/or pair of glasses move in a direction perpendicular to the direction of the projected beam 340 (e.g., as illustrated by arrows 810–811), the optical projection unit may reposition the beam 340 to compensate for the motion, as long as the motion is within the indicated range 840.

When the user's face and/or pair of glasses is rotated within the plane perpendicular to the direction of the projected beam 340, however, (as indicated by arrow 830) compensation by the projection unit 310 is slightly more complex. In one embodiment of the system, the raster scanning unit within the projection unit 310 includes an adjustable sweep circuit which modifies the horizontal and vertical deflection voltages of the scanning unit. This causes the image projected on the user's retina to rotate along with the user's head and/or glasses. In another embodiment, the scanning beam may be rotated via the direct, physical movement of one or more lenses and/or mirrors within the projection unit. Regardless of which techniques are used to compensate for the user's motion, however, the underlying principles of the invention remain the same.

A third type of motion for which compensation is required is a motion which changes the angle of incidence between the scanning beam 340 and the user's face and/or glasses. One example of this type of motion is illustrated by arrows 820–821 in FIG. 8 (i.e., clockwise or counter-clockwise within the plane of the page). To compensate, the glasses lens or contact lens may provide a certain level of tolerance such that, as long as angle of incidence between the scanning beam 340 and the lens is within an a particular range (e.g., five degrees), the beam will be projected into the user's eye in substantially the same manner. In one embodiment of the system, this is accomplished using holographic lenses.

To further improve system privacy, a bar code may be stamped on the user's glasses. This code will then be read by tracking unit 410 and verified (e.g., matched with the user's ID number) before control unit 430 will allow the projection unit 310 to generate the scanning beam 340. Alternatively, or in addition, the projection unit 310 (or other retinal identification apparatus) may initially scan and retrieve a "snapshot" of the user's retina. This retinal image will uniquely identify the user as authorized or unauthorized to view the scanned image. Any of the foregoing identification techniques will prevent unauthorized users from viewing potentially confidential information.

As illustrated in FIG. 10, one embodiment of the system employs a bifocal technology. Using this system, a user views the projected virtual image when he/she looks in a downward direction as shown through lens 1020. However, when the user directs his or her eyes straight ahead through lens 1010, he/she views the real world, unobstructed by the scanned image. Accordingly, the lens 1010 through which the scanned image beam is directed in one embodiment may be configured to receive a beam from a projection unit at a relatively oblique angle (i.e., the transmitter may be located below the user's face) and direct it into the user's retinas.

The same type of bifocal technology as that described above may be implemented with contact lenses. In addition, if contact lenses are used, they may be appropriately weighted so that they are pulled into position by gravity once inserted.

In another embodiment, illustrated in FIG. 11, a holographic lens 1110 is employed in the pair of glasses or contacts. As described above, a holographic lens may be configured to refract light only if the angle of incidence of the light is greater (or smaller) than a predetermined amount. Thus, in the embodiment illustrated in FIG. 11, light from real images (i.e., objects in the real world) substantially within the users normal field of view (such as image 1120) will pass through the lens 1110 unaffected. However, light which enters the lens 1110 from a relatively oblique angle (i.e., the scanning beam produced by the projection unit 310) will be refracted into the user's retina. Accordingly, this embodiment may be used to superimpose the virtual image over the user's normal field of view. The intensity of the virtual image may be controlled such that the user can see the real world and the virtual image. For example, the virtual image may be word processing text and the real image may be a baseball game or the user's airline meal.

Figure 9:
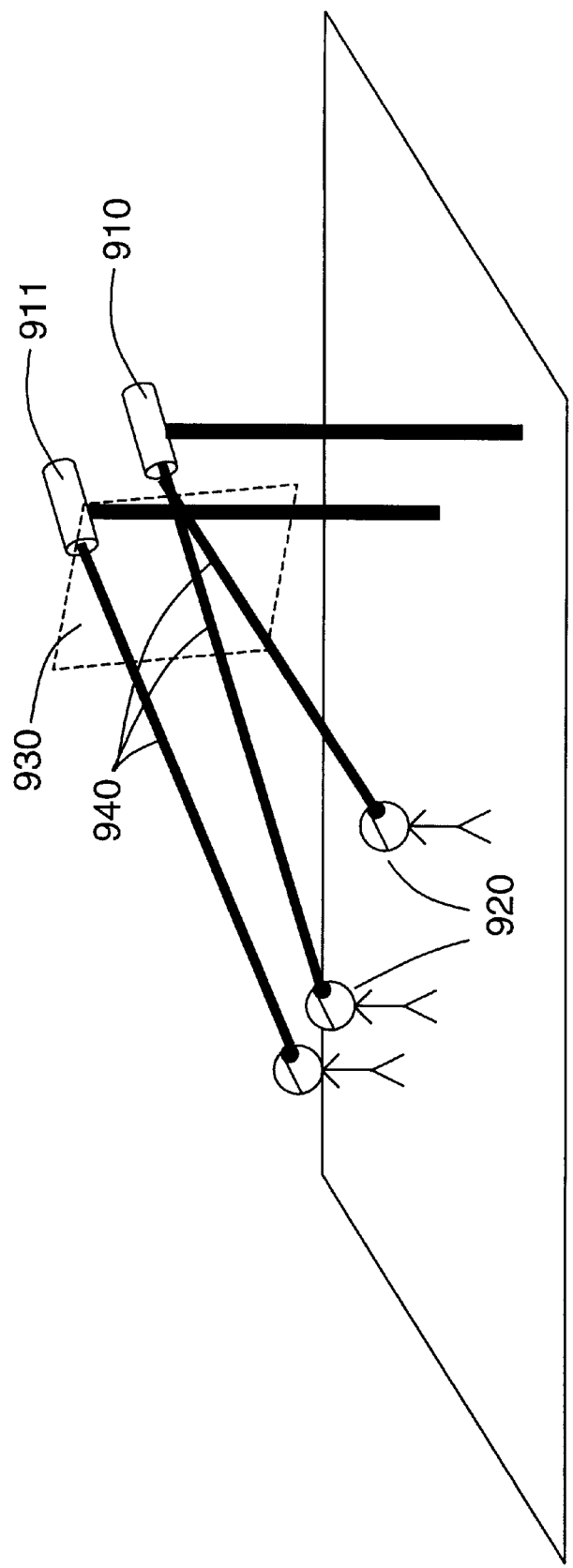
FIG. 9 illustrates one embodiment of a public information system in which elements of the virtual display system are implemented.

FIG. 9 illustrates an application-specific embodiment of the virtual display system. Several optical projection units 910, 911 and a tracking unit (not shown) may be situated in a public place (e.g., an airport, a park . . . etc). Users with a pair of glasses and/or contact lenses are then able to check information (e.g., airline departure times, local events . . . etc) simply by looking in the direction of the optical projection units 910, 911 and thereby viewing a virtual information plane 930. If a bar code system is implemented as described above, then only users with the proper authentication information (i.e., bar code) will be permitted to view private data (e.g., personal e-mail). Either a single projection unit or multiple projection units may be used in this embodiment.

Furthermore, because the virtual image is projected directly into the users' retinas, the virtual information plane 930 can be viewed anywhere—even in an outdoor area on a bright, sunny day. By contrast, monitors using current CRT technology are incapable of producing enough light to be visible under these conditions.

The number of optical projection units 910, 911 necessary for implementing this embodiment of the invention will depend on the maximum scanning frequency of each of the optical projection units 910, 911—i.e., the number of individual retinas that a single unit can scan at some minimum reasonable scanning rate. What is "reasonable" will depend on the minimum number of frames/second (i.e., the number of times that a single retina is completely scanned in a second) which will allow a human to comfortably view the scanned image (i.e., without a significant "flicker"). This minimum frame rate is typically proportional to the brightness of the projected or scanned image. For example, a bright computer screen may require a higher scanning rate (e.g., 75 Hz or greater) than in a relatively dim movie theater (e.g., 48 Hz).

In one embodiment of the virtual display system, the user's headset includes a microphone and/or earpiece for transmitting/receiving an audio signal from the public optical projection unit 910, thereby expanding the range of potential applications for the virtual display system. For example, this embodiment would allow the user to participate in video conferences.

The virtual display system described herein may be used for a variety of additional applications. For example, the system can replace big-screen television sets or other monitors which take up a substantial amount of floor space. The system can also replace large video projection systems (e.g., those used in movie theaters or large conferences), and thereby eliminate the need for large, flat projection surfaces.

In one embodiment of the system, an entire room may be filled with tracking units 410 and/or optical projection units 310 to produce a virtual reality environment. The optical projection units 310 may be spaced sufficiently close together such that as soon as the user moves out of range of one projection unit 310, he or she falls within the range of a second projection unit 310. One or more tracking units 410 continually track the direction in which the user is looking at any given time and transmit this positional data to a central control unit 430 (or several control units which communicate to one another).

In addition, numerous different users can interact within the virtual reality environment. For example, in one embodiment, a motion capture system such as those used by the motion picture industry and the video game industry tracks the motion of each user and transmits this information back (in the form of a video image) to the other users. In one embodiment, this is accomplished by affixing magnetic sensors on specific parts of each users' body and then generating a magnetic field within the virtual space which is distorted by the sensors. In another embodiment, reflective elements are placed on the user and optical sensors are positioned throughout the virtual space.

Regardless of which type of motion capture technology is used, the resulting motion data is transmitted to the central control unit 430 (or other control/computer system) which, in response, generates (via optical projection unit 310) an image representing each of the users. For example, in a "virtual nightclub," individuals would be able to select from a variety of different nightclub characters before entering into the virtual nightclub environment. The control unit 430 would then generate the selected character and project the character's image through optical projection unit 310 to all of the user's in the virtual reality environment.

One important benefit of the foregoing system over prior art systems is that users in the present system are only required to use a lightweight, inexpensive pair of glasses or contact lenses. By contrast, users of prior art virtual reality systems are required to wear heavy, bulky, typically more expensive headsets or helmets due to the electrical and optical components included therein. As such, using the present system and method, an owner of a virtual reality service need not worry about users damaging or stealing sensitive, expensive equipment. Accordingly, the present system also provides the benefit of reduced operating costs.

Finally, in one embodiment, the virtual reality system is communicatively coupled to other virtual reality systems over a network (e.g., the Internet). In this manner, users from across the globe can participate in a single virtual reality event. This may be accomplished, for example, by providing the control unit 430 with a high speed network card for connecting the control unit 430 to a high speed local area network and/or a high speed Internet connection such as a fractional T-1 or DSL channel.

Throughout the foregoing description, for the purposes of explanation, numerous specific details were set forth in order to provide a thorough understanding of the present system and method. It will be apparent, however, to one skilled in the art that the system and method may be practiced without some of these specific details. For example, the embodiments of the system and method illustrated in FIGS. 1 through 10 show a pair of glasses rather than contact lenses. It should be noted, however, that all of the underlying principles of the invention may be implemented using a pair of contact lenses. Any relevant distinctions between embodiments with contact lenses and glasses have been set forth above. Accordingly, the scope and spirit of the present invention should be judged in terms of the claims which follow.

What is claimed is:

1. A virtual image system comprising:
   a passive optical unit for interfacing with portions of a user's head;
   a plurality of optical projection units directing retinal scanning beams into said passive optical unit,
   wherein said optical projection units are detached from said passive optical unit; and
   wherein said optical projection units are disposed across an area such that when said user moves out of range of one of said optical projection units, said user is within the range of another of said optical projection units.

2. The virtual image system as claimed in claim 1 further comprising a motion capture system for collecting and transmitting positional data on users within the virtual space.

3. The virtual image system as claimed in claim 1 wherein a control unit, responsive to said positional data, causes one or more of said optical projection units to generate virtual images corresponding to the movement of the users.

4. The virtual image system as claimed in claim 1 further including a tracking unit for tracking said passive optical unit and generating positional data based on the position of said passive optical unit.

5. The virtual image system as claimed claim 4 further including a control unit for controlling said scanning beams produced by said optical projection units in response to said positional data.

6. The virtual image system as claimed in claim 5 wherein said control unit causes said scanning beams to follow said passive optical unit when said passive optical unit is moved in a direction substantially perpendicular to said scanning beams.

7. The virtual image system as claimed in claim 5 wherein said optical projection units generate said scanning beams via horizontal and vertical deflection voltages and where, in response to a rotational motion of said passive optical unit, said control unit modifies said horizontal and vertical deflection voltages.

8. The virtual image system as claimed in claim 1 wherein said passive optical unit comprises a pair of contact lenses.

9. The virtual image system as claimed in claim 1 wherein said passive optical unit comprises a pair of glasses.

10. The virtual image system as claimed in claim 1 wherein said passive optical unit comprises one or more holographic lenses.

11. The virtual image system as claimed in claim 1 wherein said optical projection units direct retinal scanning beams into two or more of said passive optical units worn concurrently by two or more users.

12. The virtual image system as claimed in claim 1 wherein two optical projection units direct separate scanning beams into different lenses of said optical projection unit.

13. A virtual image system comprising:
    a tracking unit generating positional data responsive to a position of a passive optical unit, said passive optical unit adapted to fit around portions of a user's head;
    a control unit generating control signals responsive to said positional data; and
    one or more optical projection units directing a retinal scanning beams into lenses of said passive optical unit responsive to said control signals,
    said optical projection units disposed across an area such that when said user moves out of range of one of said optical projection units, said user is within the range of another of said optical projection units.

14. The virtual image system as claimed in claim 13 wherein said control unit is a computer.

15. The virtual image system as claimed in claim 13 wherein said retinal scanning signal is a raster scan signal.

16. The virtual image system as claimed in claim 15 wherein said optical projection unit generates said scanning signal via horizontal and vertical deflection voltages and where, in response to a rotational motion of said passive optical unit, said control unit modifies said horizontal and vertical deflection voltages.

17. The virtual image system as claimed in claim 13 wherein said control signal is a vector scan signal.

18. The virtual image system as claimed in claim 13 wherein said control unit causes said scanning signal to follow said passive optical unit when said passive optical unit is moved in a direction substantially perpendicular to said scanning beam.

19. The virtual image system as claimed in claim 13 wherein said positional data includes the three-dimensional coordinates (e.g., 'x,' 'y,' 'z' coordinates) and angle (e.g., 'yaw,' 'pitch,' and 'roll') of the passive optical unit.

20. The virtual image system as claimed in claim 13 wherein said passive optical unit is a pair of contact lenses.

21. The virtual image system as claimed in claim 13 wherein said passive optical unit is a pair of glasses.

22. The virtual image system as claimed in claim 13 wherein said passive optical unit includes one or more holographic lenses.

23. The virtual image system as claimed in claim 13 wherein said optical projection units directs retinal scanning beams into two or more of said passive optical units worn concurrently by two or more users.

24. The virtual image system as claimed in claim 13 wherein two of said optical projection units direct separate scanning beams into different lenses of said optical projection unit.

25. The virtual image system as claimed in claim 13 further comprising a motion capture system for collecting and transmitting positional data on users within a virtual space.

26. The virtual image system as claimed in claim 25 wherein a control unit, responsive to said positional data, causes one or more of said optical projection units to generate virtual images corresponding to the movement of said users.

* * * * *